US011540094B2

(12) United States Patent
Macaluso

(10) Patent No.: US 11,540,094 B2
(45) Date of Patent: *Dec. 27, 2022

(54) OVER THE AIR PROVISIONING OF MOBILE DEVICE SETTINGS

(71) Applicant: SITO Mobile R&D IP, LLC, Jersey City, NJ (US)

(72) Inventor: Anthony G. Macaluso, Rancho Sante Fe, CA (US)

(73) Assignee: SITO Mobile R&D IP, LLC, Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,347

(22) Filed: Jan. 31, 2022

(65) Prior Publication Data

US 2022/0150674 A1 May 12, 2022

Related U.S. Application Data

(63) Continuation of application No. 16/983,765, filed on Aug. 3, 2020, now Pat. No. 11,272,332, which is a
(Continued)

(51) Int. Cl.
*H04W 4/00* (2018.01)
*H04W 4/24* (2018.01)
(Continued)

(52) U.S. Cl.
CPC ............... *H04W 4/24* (2013.01); *H04L 67/51* (2022.05); *H04M 1/72406* (2021.01); *H04M 3/42178* (2013.01); *H04M 15/49* (2013.01); *H04M 15/51* (2013.01); *H04M 15/80* (2013.01); *H04W 4/00* (2013.01); *H04W 8/205* (2013.01); *G06F 9/445* (2013.01); *H04W 8/18* (2013.01)

(58) Field of Classification Search
CPC ........ H04W 4/24; H04W 48/08; H04W 48/16
See application file for complete search history.

(56) References Cited

U.S. PATENT DOCUMENTS

2003/0033357 A1* 2/2003 Tran ...................... H04L 67/567
709/217

* cited by examiner

*Primary Examiner* — Michael T Vu
(74) *Attorney, Agent, or Firm* — PK Patent Law

(57) ABSTRACT

A mobile device has a display, a memory, an antenna, a transceiver connected to the antenna for communicating voice and data through a wireless communication system, at least one processor, and executable instructions stored in the memory. The executable instructions, when executed by the at least one processor, (i) cause the mobile device to communicate wirelessly with one or more remote servers; (ii) cause the mobile device to display on the display, a user interface for enabling the user of the mobile device to select a mobile network service provider; (iii) in response to a selection, cause the mobile device to be configured for use with a first one of a plurality of mobile network service providers and enable access by the mobile device of wireless communication service; and (iv) in response to a selection, cause the mobile device to be configured for use with a second one of the plurality of mobile network service providers and enable access by the mobile device of wireless communication service provided by the second one of the plurality of mobile network service providers for a service plan offered by the second one of the plurality of mobile network service providers.

30 Claims, 4 Drawing Sheets

Related U.S. Application Data continuation of application No. 16/521,076, filed on Jul. 24, 2019, now Pat. No. 10,735,920, which is a continuation of application No. 14/498,645, filed on Sep. 26, 2014, now Pat. No. 10,368,214, which is a continuation of application No. 12/956,997, filed on Nov. 30, 2010, now Pat. No. 8,862,115, which is a continuation of application No. 12/505,306, filed on Jul. 17, 2009, now Pat. No. 7,865,182, which is a continuation of application No. 10/682,312, filed on Oct. 8, 2003, now Pat. No. 7,565,141.

(51) Int. Cl.
*H04M 3/42* (2006.01)
*H04M 15/00* (2006.01)
*H04M 1/72406* (2021.01)
*H04L 67/51* (2022.01)
*H04W 8/20* (2009.01)
*G06F 9/445* (2018.01)
*H04W 8/18* (2009.01)

OVER THE AIR PROVISIONING OF MOBILE DEVICE SETTINGS

CROSS-REFERENCE TO RELATED APPLICATIONS

This application is a continuation of U.S. application Ser. No. 16/983,765, filed on Aug. 3, 2020, which is a continuation of U.S. application Ser. No. 16/521,076, filed on Jul. 24, 2019, now U.S. Pat. No. 10,735,920, which is a continuation of U.S. application Ser. No. 14/498,645, filed on Sep. 26, 2014, now U.S. Pat. No. 10,368,214, which is a continuation of U.S. application Ser. No. 12/956,997, filed on Nov. 30, 2010, now U.S. Pat. No. 8,862,115, which is continuation of U.S. application Ser. No. 12/505,306, filed on Jul. 17, 2009, now U.S. Pat. No. 7,865,182, which is a continuation of U.S. application Ser. No. 10/682,312, filed on Oct. 8, 2003, now U.S. Pat. No. 7,565,141, the entire contents of which are incorporated herein by reference.

TECHNICAL FIELD

This disclosure relates to providing services to a mobile device, and more particularly to over the air provisioning of settings and applications for one or more service providers.

BACKGROUND

Most mobile phones that are available to consumers are typically limited to use with a particular service provider or carrier. This limitation on use is the result of certain settings that are programmed into the mobile phone at the time of manufacture. Thus, a particular model of mobile phone may be manufactured in many different versions, one for each service provider that offers the particular mobile phone.

Many carriers market mobile phones for use with their networks through small retail stores that are associated with the carrier. Such stores typically limit their focus to the sale of phones that can be used with the carrier, accessories for those phones, and calling plans for the carrier. In addition, such stores may also provide some post-purchase services, such as repair, warranty, and technical support services, for their subscribers. Mobile phones may also be marketed through mass retailers, such as Radio Shack, Wal-mart, and Costco. Typically, mass retailers will offer mobile phones for multiple different carriers, but such retailers may be more limited in the types of post-purchase services they offer. Both types of retail outlets, however, typically provide activation services, in which a salesperson programs the mobile phone with information necessary to use the mobile phone and notifies the carrier of the new subscriber's information.

SUMMARY

One result of the conventional practice of manufacturing phones so that they can be used with only one carrier is that, for any given service provider, consumers have a somewhat limited selection of mobile phone models. Because each mobile phone typically is manufactured for use with only a single service provider, manufacturers (and service providers) will offer fewer than every possible model for every service provider. Instead, they will choose a relatively small number of models to market in connection with each service provider. Another result is that retailers who offer the same mobile phone model for multiple different service providers must frequently keep on hand (and track) a larger inventory than would otherwise be necessary. For example, a retailer might offer a particular model of mobile phone for use with three different service providers. Because the mobile phone is programmed in the factory with different settings for each of the three providers, the retailer typically must carry a larger inventory than if the particular model could be used with any of the three carriers.

Techniques are described here that enable a mobile device to be manufactured and sold without being limited to use in connection with a particular service provider. Instead, the service provider may be selected at the time of or after purchase of the mobile device. Settings that correspond to the selected service provider and/or that enable access to the services of the selected service provider may be downloaded to the mobile device over the air and used to change the settings of the mobile device by an application on the mobile device. Service plans and applications can also be selected using the application.

In one general aspect, a request for mobile service subscription options may be received from a mobile device, and data relating to mobile service subscription options for selection by a user of the mobile device may be sent to the mobile device over a wireless communication path. A selection of one or more subscription options may be received from the mobile device over the wireless communication path, and a service corresponding to the one or more selected subscription options may be activated in response to the selection.

Implementations may include one or more of the following features. For example, the request for mobile subscription options from the mobile device may be an activation request. The mobile device may be a mobile phone, a personal digital assistant, a pager, or virtually any other mobile device having a wireless communications capability. The mobile device may be capable of operation with a number of service providers, and the data relating to mobile subscription options may identify a number of available service providers. The selection of one or more subscription options may be an identification of a selected service provider. The available service providers may be mobile virtual network operators. Activating a service may include sending data representing one or more settings for the mobile device, with the data being sent over the wireless communication path. The one or more settings may allow the mobile device to obtain service from the selected service provider. The one or more settings may include a preferred roaming list. The data relating to mobile subscription options and the data representing one or more settings for the mobile device may be adapted for use on Qualcomm's Binary Runtime Environment for Wireless (BREW) platform on the mobile device.

The data relating to mobile subscription options may include an identification of a number of available service plans. Activating a service may involve selecting settings data associated with the selected subscription option from stored respective sets of settings data associated with each of the mobile services subscriptions options.

In another general aspect, settings for a mobile device may be provisioned by associating a mobile device with a particular service, identifying settings data associated with the particular service from a database containing settings data for multiple services, and sending settings data for the particular service to the mobile device over a wireless communication link. An application on the mobile device may be operable to use the settings data to change operational settings for the mobile device.

Implementations may include one or more of the following features. For example, the particular service comprises a mobile voice communication service associated with a specific service provider. The settings data may include a preferred roaming list for the specific service provider. The settings data may identify operational settings that, when installed on the mobile device, enable the mobile device to access the particular service provided by the specific service provider. The particular service may be offered by a mobile virtual network operator. The application on the mobile device may be adapted for use on a Binary Runtime Environment for Wireless (BREW) platform on the mobile device. The multiple services may include multiple mutually exclusive mobile communication services, and the database of settings data may store settings data for each of the mutually exclusive mobile communication services.

In another general aspect, a mobile device may include a transceiver operable to communicate over a wireless communication link, one or more memories, and a processor. The one or more memories may store an address of a server that stores settings data associated with one or more mobile services. The memories may also store client software for an application execution environment. The memories may be operable to store one or more applications that are executable on the client software and that include instructions for communicating with the server at the stored address, receiving settings data, and storing the received settings data in the one or more memories. The processor may be coupled to the transceiver and the one or more memories. The processor may be operable to execute the one or more stored applications and to control communications by the transceiver.

Implementations may include one or more of the following features. For example, the server may be an application download server. The client software may be Binary Runtime Environment for Wireless (BREW) client software. The one or more applications may be adapted for execution by the BREW client software. The received settings data may be settings that enable wireless communications using a particular service provider. The mobile device may include a visual display, and the one or more applications may include instructions for causing the processor to retrieve a list of available service providers from the server, display the list of available service providers on the visual display, receive a user selection of a particular service provider, and transmit an indication of the user selection from the transceiver to the server. The one or more applications may include instructions for causing the processor to retrieve a list of available service plans from the server, display the list of available service plans on the visual display, receive a user selection of a particular service plan, and transmit an indication of the user selection from the transceiver to the server.

In yet another general aspect, a system may include an application download server and a mobile communication system interface. The application download server may store mobile device settings for accessing services associated with one or more mobile service providers. The application download server may be operable to selectively send the mobile device settings to selected mobile devices for use in modifying the settings for each selected mobile device. The mobile communication system interface may be adapted to connect the application download server to a mobile communication system. The mobile device settings are sent to the mobile device over a wireless communication link between the mobile device and the mobile communication system.

Implementations may include one or more of the following features. For example, the services associated with the one or more mobile service providers may be wireless communication services. The mobile device settings may include settings necessary to enable the mobile devices to access the wireless communication services for the one or more mobile service providers. The mobile device settings may include a plurality of preferred roaming lists, with each preferred roaming list associated with a particular service provider. A preferred roaming list may be sent to each mobile device, with the preferred roaming list corresponding to a selection of a service provider received through the mobile communication system interface from the mobile device. The application download server may further store applications for downloading to the mobile devices through the mobile communication system. One or more of the applications may include instructions for enabling a user to select a particular service provider from which to receive wireless communication services.

In yet another general aspect, a method may include receiving a request for an application from a mobile device by at least one processor, transmitting the application to the mobile device by the at least one processor, and storing application download event information by the at least one processor. The application download event information may be transmitted to a transaction manager by the at least one processor, and the transaction manager may determine one or more usage records based on the application download event information.

In another aspect, a mobile device has a display, a memory, at least one processor, and executable instructions stored in the memory. The executable instructions, when executed by the at least one processor, (i) cause the mobile device to display on the display a user interface presenting a plurality of mobile network carrier options and presenting, for each of the mobile network carrier options, one or more service plan options and (ii) in response to a selection, by a user of the mobile device from the user interface, of one of the plurality of mobile network carriers and a selection of a service plan option for the selected one of the plurality of mobile network carriers, cause the mobile device to be activated for use with the selected one of a plurality of mobile network carriers and enable access by the mobile device of wireless communication services provided by the selected one of the plurality of mobile network carriers for the selected service plan.

In another aspect, a mobile device has a display, a memory, at least one processor, and executable instructions stored in the memory. The executable instructions, when executed by the at least one processor, (i) cause the mobile device to communicate over a cellular network with one or more remote servers to receive mobile network carrier option data for the mobile device, wherein the one or more remote servers are operated by an entity that is not a mobile network carrier identified by the mobile network carrier option data, (ii) display on the display, based on the received mobile network carrier option data, a user interface presenting a plurality of mobile network carriers, and (iii) in response to a selection, by a user of the mobile device from the user interface, of one of the plurality of mobile network carriers, cause the mobile device to be activated for use with the selected one of the plurality of mobile network carriers and enable access by the mobile device of wireless communication services provided by the selected one of the plurality of mobile network carriers for a service plan offered by the selected one of the plurality of mobile network carriers.

The details of one or more embodiments are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

In accordance with the described techniques, mobile phones and other types of mobile devices may be produced without preprogramming the device with settings that limit use of the mobile device to a particular service provider and/or that are necessary to use the mobile device with a particular service provider. Instead, the mobile device may be offered through retail outlets with a minimal number of settings that enable the mobile device to contact a server that stores additional settings for one or more service providers. When a consumer purchases the mobile device, he may activate the mobile device by selecting a service provider and/or calling plan using a "select carrier" application (offered under the mark CARRIER SELECT™) on the mobile device. In response, the server may push the appropriate settings to the mobile device over a wireless communication link. The consumer may also purchase applications for the mobile device, which also may be pushed to the mobile device by the server. Thus, operational settings that are necessary to use the mobile device and applications may be provided through "over the air" provisioning.

Once the consumer selects a particular service provider and/or a particular calling plan, the "select carrier" application may be temporarily disabled (e.g., for a period of three months), which accounts for a minimum term of service. Thereafter, however, the consumer may wish to change service providers and/or calling plans. Once the minimum term of service has elapsed, a short messaging service (SMS) message that reactivates the "select carrier" application may be sent from the server to the mobile device. The consumer may then use the "select carrier" application to, for example, select a new service provider and/or change calling plans. The "select carrier" application or some other application may also be used to perform an over the air update of settings in the mobile device that may change over time.

Figure 1:
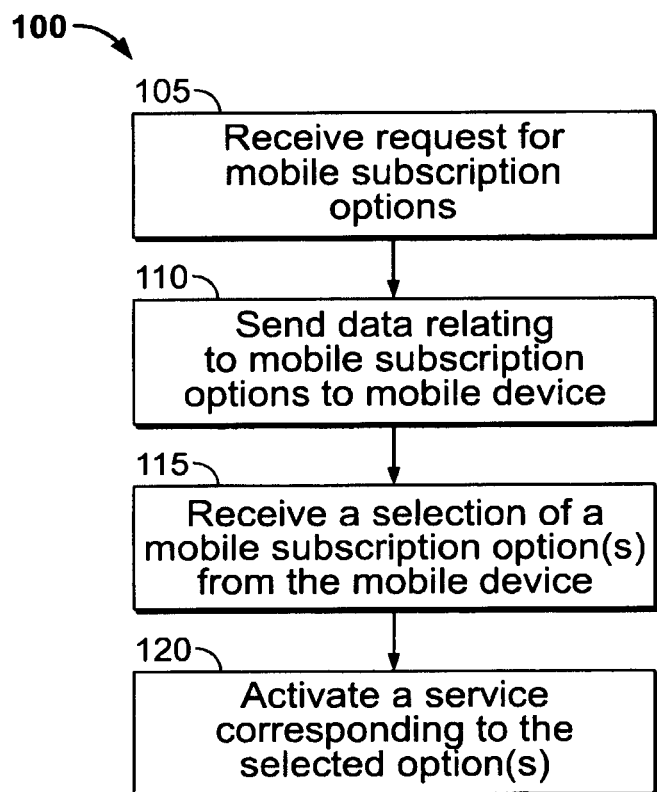
FIG. 1 is a flow diagram of a process for providing services to a mobile device.

FIG. 1 is a flow diagram of a process 100 for providing services to a mobile device. In accordance with the process 100, a request for mobile service subscription options is received from the mobile device (step 105). In some implementations, the request may represent an initial message that is sent when a user first activates the mobile device (i.e., after or during the purchase process) using an application that is stored in the mobile device or that is downloaded at the time of the initial activation. Alternatively, the request may represent a request for new or updated subscription options that may be initiated automatically by an application stored in the mobile device or manually through a user's interaction with an application stored in the mobile device. The mobile service subscription options may include different service providers and/or calling plans.

In response to the request for mobile service subscription options, data relating to the mobile subscription options may be sent to the mobile device (step 110). This data may be sent to the mobile device over a wireless communications path. The data may be used by an application on the mobile device to enable a user to select a particular subscription option or options. A selection of one or more subscription options may be received from the mobile device over the wireless communications path (step 115). In response to the selection, a service corresponding to the one or more subscription options may be activated (step 120).

For example, the selected subscription option may include a selection of a particular service provider. In response to this selection, the mobile device may be registered with the particular service provider. In addition, the selected subscription option may include a specific calling plan offered by the service provider. In response, the new calling plan may be associated with the mobile device.

Figure 2:
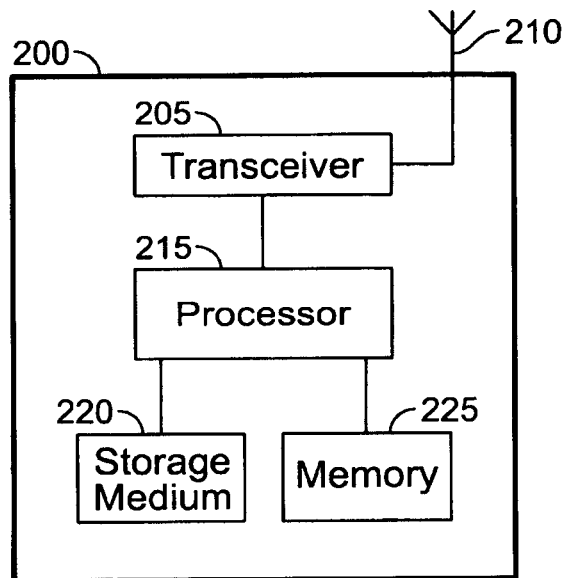
FIG. 2 is a block diagram of a mobile phone that may be used in connection with the described techniques.

FIG. 2 is a block diagram of a mobile phone 200 that may be used in connection with the described techniques. The mobile phone 200 includes a transceiver 205 connected to an antenna 210 for communicating voice and data to and from a remote server, wireline telephone connection, and/or another mobile device through a wireless communication system in accordance with conventional techniques. For example, the wireless communication system may be a CDMA, GSM, or UMTS network, or any other type of mobile network. The transceiver 205 is connected to a processor 215 that controls the operation of the mobile phone 200, including the operation of the transceiver 205. A storage medium 220, which may be removable, read-only, or read/write media and may be magnetic-based, optical-based, semiconductor-based media, or a combination of these, may store operating system software for the mobile phone 200 and may also store at least some settings data. A memory 225 may store additional, less vital information, such as applications that may be loaded into the mobile phone 200. In addition, some or all of the settings data for the mobile phone 200 and/or for a particular service provider may be stored in the memory 225. Both the memory 225 and the storage medium 220 are connected to the processor 215. The processor 215 may operate in accordance with software, applications, or other instructions stored in the memory 225 and/or the storage medium 220.

In one possible implementation, the mobile phone 200 may have a generic construction that does not require the mobile phone 200 to be used with any particular service provider. Thus, instead of having most or all of the settings necessary to use the mobile phone 200 with a particular service provider preinstalled, the mobile phone 200 may have a minimal number of settings that provide connectivity to a server from which settings for a particular service provider may be downloaded. In addition, the mobile phone 200 may include an application that interacts with the server to enable a user of the mobile phone 200 to select a carrier and/or calling plan. As an alternative to a preinstalled application, the memory 225 and/or storage medium 220 may store instructions for retrieving the application from the server.

The application may be written in Java code, C/C++ code, in accordance with a Binary Runtime Environment for Wireless (BREW) Software Development Kit (SDK), or some other appropriate format. The storage medium 220 in the mobile phone 200 may include a Java virtual machine. Alternatively or in addition, the storage medium 220 may include BREW client software. The BREW platform, which was developed by Qualcomm and is described in greater detail at "www.qualcomm.com/brew," enables Java and BREW applications to be easily downloaded onto and executed on the mobile phone 200. As another alternative, the storage medium 220 may include software for implementing Motorola's Integrated Digital Enhanced Network (iDEN) technology. Although the illustrative implementations described here focus primarily on the use of BREW technology, the techniques are not limited to the use of BREW but may be implemented in connection with other technologies, such as iDEN and Java. In general, a Java virtual machine may be run on top of the BREW client to support Java applications/applets and other types of extensions may be run on top of the BREW client to support other types of applications. Applications, such as the "select carrier" application mentioned above and other applications that are designed to allow over the air modification of mobile phone settings, may therefore be easily loaded onto the mobile phone 200.

Figure 3:
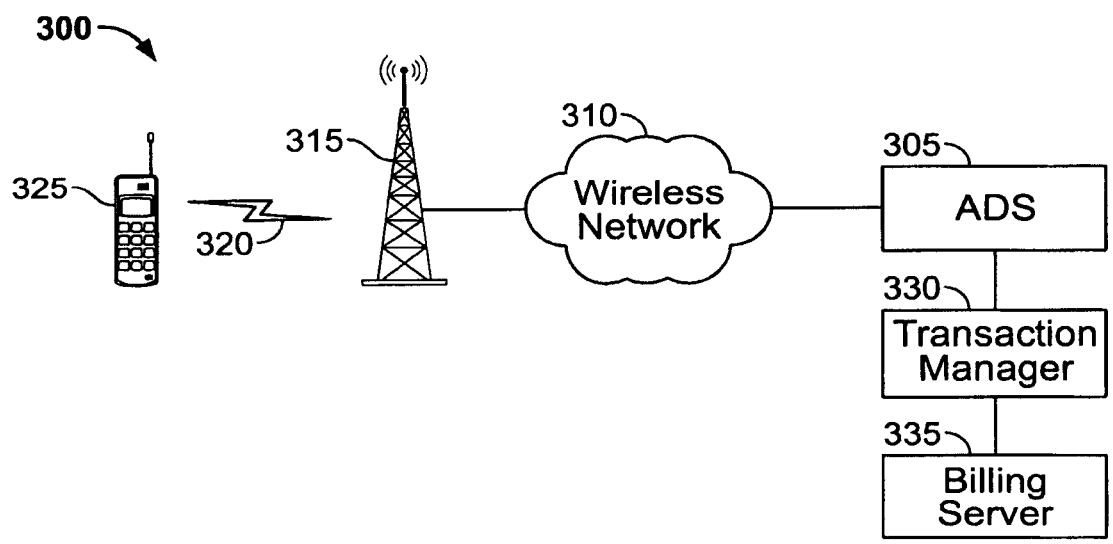
FIG. 3 is a block diagram of a system for supporting a BREW solution.

FIG. 3 is a block diagram of a system 300 for supporting a BREW solution. A BREW, Java, or other BREW-compatible application may be stored on an application download server (ADS) 305 and may be downloaded from the ADS 305, through a wireless network 310, and to a base station 315 in the vicinity of a mobile phone 325 for which the application is intended. The base station 315 may in turn transmit the application over a wireless communication link 320 to the mobile phone 325. When an application is downloaded from the ADS 305, the ADS 305 collects application download event information and sends it to a transaction manager 330. The transaction manager 330 combines the download event information with other information, such as application pricing structure and developer data for the downloaded application, to produce usage records. The transaction manager 330 sends the usage records to a billing server 335, which may perform billing services, such as generating invoices. In addition, the billing server 335 may allow an application developer, a carrier, and/or a third party associated with the ADS 305 to run a report and find out how many users are subscribing to a particular service offering or application on an up-to-the-minute basis.

The ADS 305 may be associated with a particular operator or with a third party. In some implementations, the ADS 305 may be operated by a third party that offers the mobile services for a number of service providers. The ADS 305 may store applications and data for downloading to mobile devices, including the settings for the different service providers that can be downloaded over the air to mobile devices to enable access to the each provider's services, data regarding service plans, and one or more applications that may be downloaded to allow access to and selection of the settings and service plan data.

The ADS 305 may also store other applications, which may be developed by the operator of the ADS 305, by one or more carriers, and/or by third party developers. It is possible that the ADS 305 may offer only pass-through access to certain carrier and/or third party applications, such that the applications are stored and managed on a server associated with the carrier or third party. In some embodiments, however, most or all of the available applications may be stored and managed on the ADS 305. The operator of the ADS 305 may have agreements with the carriers or other third party developers to offer the applications and to provide for payment to the carriers or other third party developers.

Applications that are stored on the ADS 305 and that may be downloaded to a mobile device may include applications for activating or changing virtually any setting and/or functionality of the mobile device using an over the air process. For example, when a new area code is implemented, an application may be installed on a mobile device that allows manipulation of a phonebook stored on the mobile device to change the area code for affected numbers from the old area code to the new area code. Similarly, if the area code for a mobile phone is to be changed, an application may be downloaded and/or installed to the mobile phone that allows the ADS 305 to remotely and automatically update the settings on the mobile phone to change the area code portion of the phone number associated with the mobile phone. An application may also allow a new phone number or a portable phone number (i.e., that was previously assigned to a different mobile phone by a different provider) to be assigned to and stored in a mobile phone. An application may be installed on a mobile device and/or stored in the ADS 305 that allows software patches or fixes to be sent out to disabled mobile devices or mobile devices that are not functioning correctly. Applications may also allow the ADS 305 to change settings such as the user's screen saver, ring tone, and backlighting.

The services offered on the ADS 305 may be based on agreements between the operator of the ADS 305 and the service providers for the ADS operator to act as a sales outlet for the services. By selecting a particular service provider, a mobile device user may enter into a contractual relationship with the service provider with the ADS operator acting as an intermediary. Alternatively, the ADS operator may act as a mobile virtual network operator (MVNO), in which case the ADS operator essentially becomes a reseller of cellular airtime and other mobile services. Thus, the ADS operator purchases the minutes and resells them to the subscriber, and the contractual relationship is between the consumer and the ADS operator. In either case, the ADS operator may offer phones on the market that allow consumers to choose a desired service provider and/or service plan.

Figure 4:
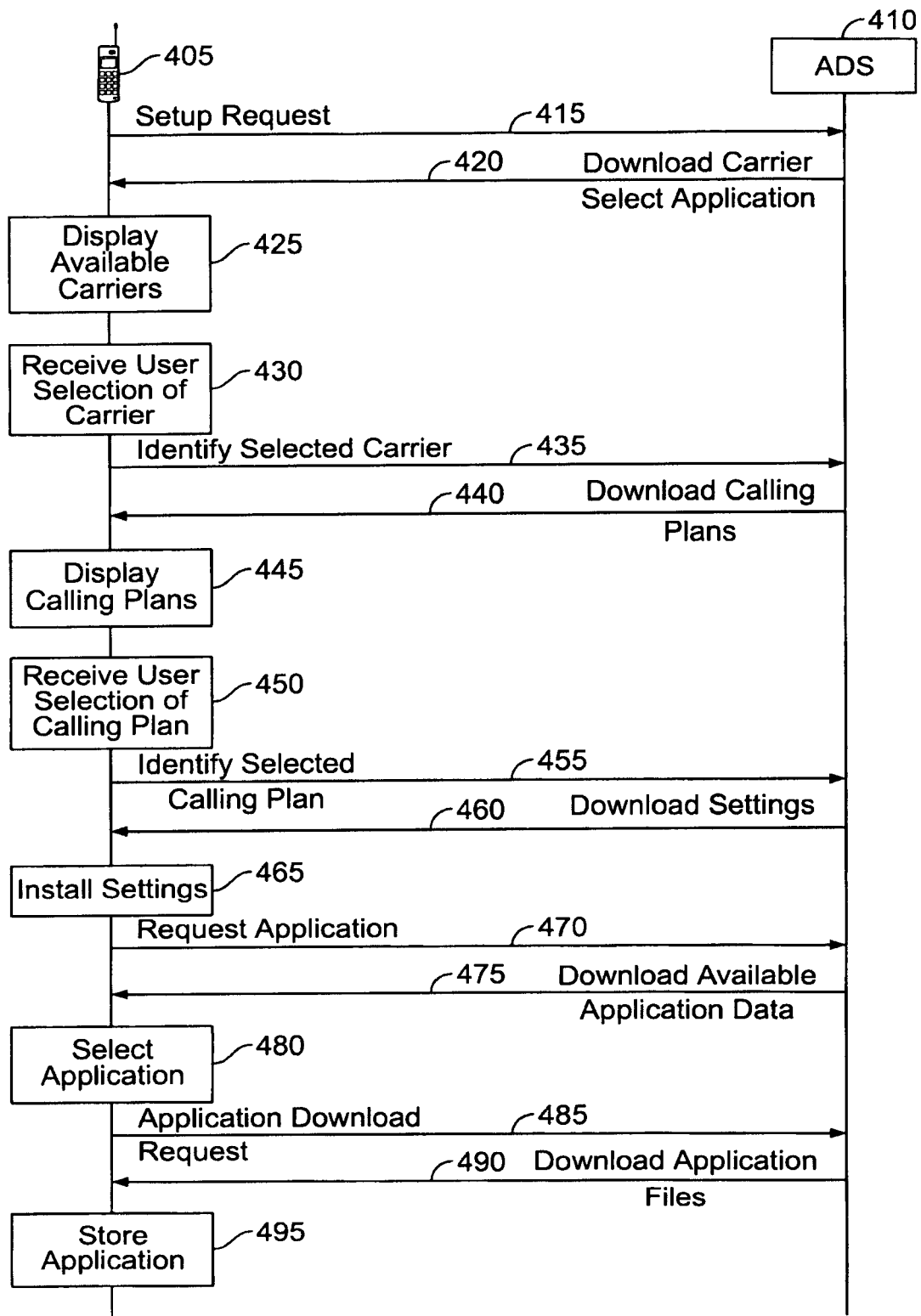
FIG. 4 is a process and signal flow diagram for providing over the air provisioning of mobile services.

FIG. 4 is a process and signal flow diagram for providing over the air provisioning of mobile services. The process and signal flow may be performed at the point of sale (e.g., by a salesperson at the store) or by the consumer (e.g., after leaving the store). A mobile device 405 may be marketed and sold with a minimal number of settings that allow the mobile device 405 to connect to an ADS 410 associated, for example, with an entity that acts as an MVNO for multiple different actual service providers. These settings may include, for example, an Internet Protocol (IP) address for the ADS 410 and an ESN for the mobile device 405. In addition, the mobile device 405 generally needs to include an application execution environment, such as BREW or Java, that allows the mobile device 405 to execute instructions for performing the initial activation sequences. Other than a minimal number of settings and initial activation instructions, however, settings and applications for enabling access to ordinary cellular service and/or to advanced services may be downloaded to the mobile device 405 over the air during or after the initial activation.

When the mobile device 405 is first taken out of the box and activated, a setup request signal 415 is sent from the mobile device 405 over a wireless communication link to the ADS 410. The setup request signal 415 may include the ESN for the mobile device 405 and indicates that the mobile device 405 is being activated. The setup request signal 415 may also include or be preceded by a security and setup handshake (not shown). In response to the setup request signal 415, the ADS 410 may download 420 a carrier select application and associated data to the mobile device 405. In some instances, the carrier select application may be preinstalled on the mobile device 405, in which case the download signaling 420 may simply represent data regarding which carriers are available for use with the mobile device 405. The carrier select application may represent a BREW, Java, or other appropriate type of application.

The mobile device 405, using the carrier select application, may then display a menu of the available carriers on a screen (step 425) and receive a user selection of a particular carrier (step 430). A signal 435 identifying the selected carrier may then be sent to the ADS 410. The ADS 410 may respond by downloading available calling plans 440 for the selected carrier. The mobile device 405, using the carrier select application, may then display a menu of the available calling plans on a screen (step 445) and receive a user selection of a particular calling plan (step 450). A signal 455 identifying the selected calling plan may then be sent to the ADS 410.

The ADS 410 may send a signal 460 containing settings for the carrier and/or the calling plan. These settings may be used for and/or necessary to allow the mobile device 405 to be used with the selected carrier and/or the selected calling plan. The settings in a BREW-based implementation may include, for example, a primary domain name server (DNS) IP address (e.g., 166.102.165.11), a secondary DNS IP address (e.g., 166.102.165.11), an ADS commercial server URL (e.g., singletouch-vipl.qualcomm.com) or IP address, and an ADS test server URL. Initially, the ADS commercial server URL may store the address for the ADS that allows the user to download the carrier select application and/or associated data. In some cases, this address setting may be changed once the user selects a particular carrier. In implementations in which it is desirable to allow the user to subsequently change carriers through an over the air process (e.g., if the user becomes unhappy with the initially selected service provider and wants to switch to a different carrier after fulfilling a minimum subscription length), however, maintaining the same ADS commercial server address may allow the user to reselect carriers at some subsequent time and to access the other applications offered by the operator of the initial ADS.

In connection with offering mobile services associated with one or more service providers, the ADS 410 may store one or more preferred roaming lists (PRLs), one or more of which is associated with each carrier. A preferred roaming list is a setting that may be installed on a mobile phone to support roaming functionality. When a mobile phone is taken out of its home area and goes into a roaming mode, the preferred roaming list may identify the order in which roaming networks are selected, which networks are allowed, and what rates are charged. Storing preferred roaming lists for multiple carriers on the ADS 410, and allowing them to be downloaded to mobile phones, enables a mobile phone to be offered without being limited to use with a particular carrier. Thus, selection of a carrier (and downloading of a PRL) may be made after purchasing the mobile phone.

Other settings with example values in parentheses may include an application execution environment (AEE) authentication policy (subscriber identification (SID)), AEE privacy policy (BREW or carrier), key use (B-key), OEM programmed B-key (0), carrier ID (55), ADS type (commercial), and mobile identification number (MIN) for SID (true). Additional settings may also be pushed to the mobile device 405 over the air for installation. Typically, a mobile phone includes a large number of settings and functionalities, at least some of which may be modified in accordance with the described over the air processes. In a conventional activation process, such settings are entered by a clerk at the store where the mobile phone or calling plan is purchased. By using the described techniques, however, these settings may be provisioned in an over the air process.

Once the settings are received by the mobile device 405, the carrier select application (or some other application that has been loaded onto the mobile device) may install the settings on the mobile device 405 (step 465), which activates the mobile device 405 for use with the selected carrier. At any time thereafter and in accordance with standard BREW functionalities, the user or the mobile device 405 may send a request signal 470 requesting an identification of applications that are available for download. In response, a signal 475 identifying the available applications may be downloaded from the ADS 410 to the mobile device 405. Typically, the ADS 410 may send different lists of available applications depending on the type and capabilities of the mobile device 405 and the selected carrier and calling plan. The user, using a user interface on the mobile device 405, may select one or more applications (step 480), and an application download request 485 may be sent to the ADS 410. In response, the selected application files may be downloaded 490 and stored 495 on the mobile device 405. Thereafter, the application may be used on the mobile device 405 (at least until the application subscription expires or the application is deleted from the mobile device 405).

Figure 5:
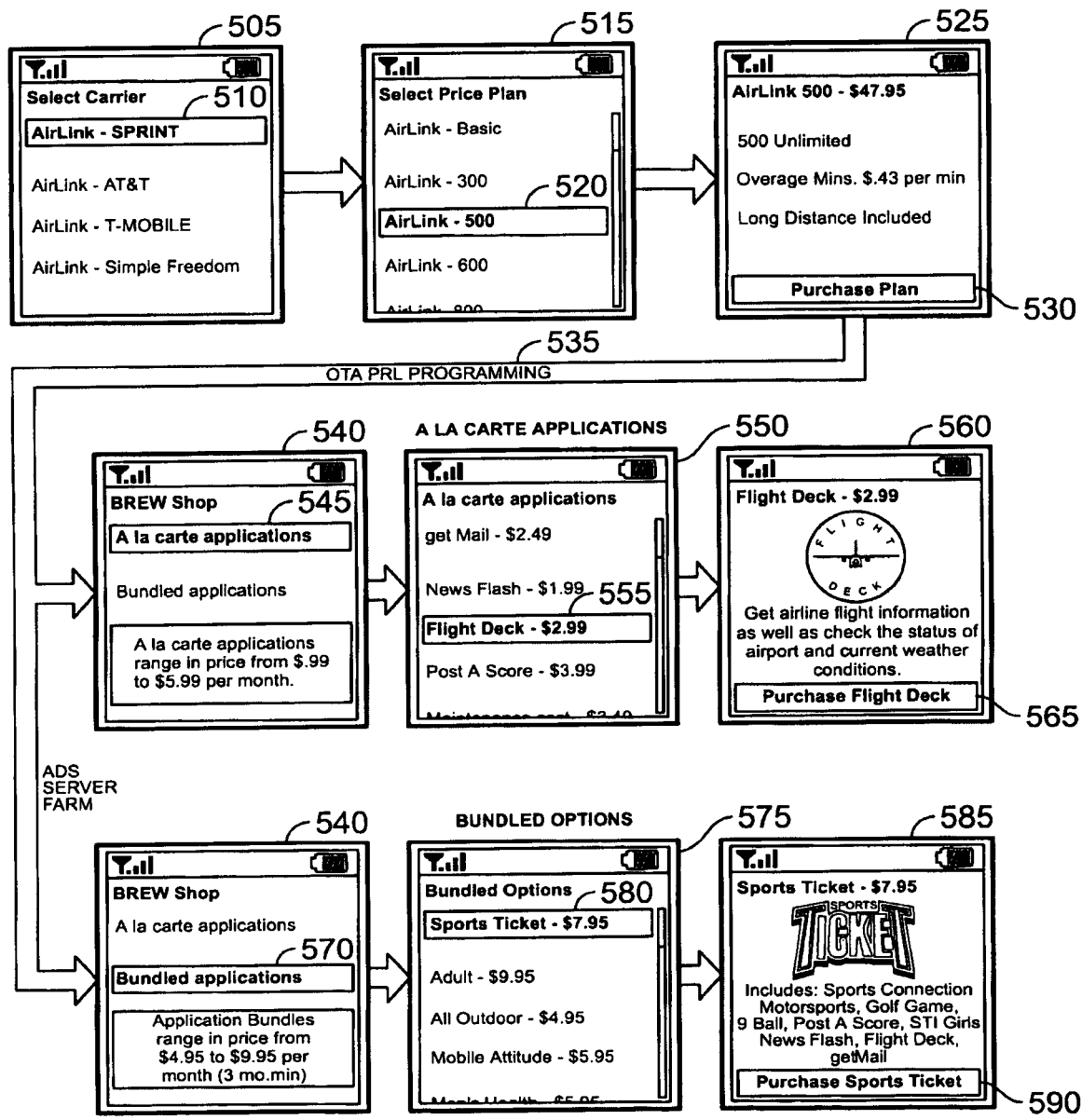
FIG. 5 depicts a screen sequence that may be displayed on a mobile device for a carrier selection application that may be executed on the mobile device.

FIG. 5 depicts a screen sequence 500 that may be displayed on a mobile device for a carrier selection application that may be executed on the mobile device. Initially, a select carrier screen 505 may provide a listing of available service providers, from which a user may select a particular service provider 510 using keys, a track wheel, or other interface components on the mobile device. In the illustrated example, the available service providers are offered through a MVNO arrangement, as indicated by the AirLink designation. Once the user selects a particular carrier 510, a select price plan screen 515 displays a listing of available calling or service plans. Again, the user may select a particular service plan 520 using keys, a track wheel, or other interface components on the mobile device. Once the user selects a particular service plan 520, a service plan detail screen 525 may be displayed, which includes a purchase plan button 530 that allows the user to purchase the selected plan 520. After purchasing the selected plan 520, over the air (OTA) programming 535 of the appropriate PRL and other settings is performed.

Thereafter, the user may have access to one or more ADS servers (i.e., an ADS server farm) that contain BREW, Java, and/or other types of applications that may be purchased and downloaded onto the mobile device. A BREW shop screen 540 may be displayed to allow the user to select between browsing individual (i.e., a la carte) applications 545 or browsing packaged or bundled options 550. If the user opts to browse the a la carte applications 545, an a la carte application list screen 555 is displayed that lists the available individual applications. The user may select one of the applications 560, in which case an application detail screen 565 is displayed. The application detail screen 565 includes a purchase application button 570 that allows the user to purchase the selected application 560. If the user opts to browse the bundled options 550, a bundled options list screen 575 is displayed that lists the available application/service bundles. The user may select one of the bundles 580, in which case a bundle detail screen 585 is displayed. The bundle detail screen 585 includes a purchase bundle button 590 that allows the user to purchase the selected bundle 580.

A number of implementations have been described. Nevertheless, it will be understood that various modifications may be made. For example, signals described in connection with FIG. 4 may be combined with other signals and/or may be separated into multiple separate signals. In addition, although the techniques are described in connection with BREW and Java technologies, other platforms may also be used. Accordingly, other implementations are within the scope of the following claims.

What is claimed is:

1. A mobile device comprising:
  a display;
  a memory;
  an antenna;
  a transceiver connected to the antenna for communicating voice and data over a wireless communication network;
  at least one processor; and
  executable instructions stored in the memory, the executable instructions, when executed by the at least one processor,
  (i) cause the mobile device to communicate wirelessly over the wireless communication network with one or more remote servers to wirelessly receive mobile network service provider settings data over the wireless communication network for a plurality of different mobile network service providers and to store the received mobile network service provider settings data in the memory;
  (ii) cause the mobile device to display on the display, based on the received mobile network service provider settings data, a user interface for enabling a user of the mobile device to select a mobile network service provider from among the plurality of mobile network service providers that are available to provide a wireless service for the mobile device;
  (iii) in response to a selection, by the user of the mobile device from the user interface, of a first one of the plurality of mobile network service providers, cause the mobile device to be configured for use with the first one of the plurality of mobile network service providers and enable access by the mobile device of a wireless communication service provided by the first one of the plurality of mobile network service providers for a service plan offered by the first one of the plurality of mobile network service providers; and
  (iv) in response to a selection, by the user of the mobile device from the user interface, of a second one of the plurality of mobile network service providers, cause the mobile device to be configured for use with the second one of the plurality of mobile network service providers and enable access by the mobile device of a wireless communication service provided by the second one of the plurality of mobile network service providers for a service plan offered by the second one of the plurality of mobile network service providers.

2. The mobile device of claim 1, wherein at least one of the plurality of mobile network service providers is a mobile network carrier.

3. The mobile device of claim 2, wherein the one or more settings are received by the mobile device wirelessly.

4. The mobile device of claim 1, wherein the mobile device includes a setting that specifies one or more conditions under which the wireless service provided by the first one of the plurality of mobile network service providers and the wireless service provided by the second one of the plurality of mobile network service providers are to be provided.

5. The mobile device of claim 4, wherein the one or more conditions include an order in which the wireless service provided by the first one of the plurality of mobile network service providers and the wireless service provided by the second one of the plurality of mobile network service providers are to be provided.

6. The mobile device of claim 1, wherein the mobile device includes a setting that specifies when the wireless service provided by the first one of the plurality of mobile network service providers is allowed.

7. The mobile device of claim 6, wherein the mobile device further includes a setting that specifies when the wireless service provided by the second one of the plurality of mobile network service providers is allowed.

8. The mobile device of claim 1, wherein the mobile device includes a setting that specifies what rates are charged for the wireless service provided by the first one of the plurality of mobile network service providers.

9. The mobile device of claim 1, wherein the executable instructions, when executed by the at least one processor, further enable the user of the mobile device to choose the service plan offered by the first one of the plurality of mobile network service providers and to choose the service plan offered by the second one of the plurality of mobile service providers.

10. The mobile device of claim 1, wherein the executable instructions are preinstalled on the mobile device prior to an end user purchasing the mobile device.

11. The mobile device of claim 1, wherein the executable instructions are wirelessly downloaded by the mobile device from an application download server.

12. The mobile device of claim 1, wherein the executable instructions, when executed by the at least one processor, further enable software patches and fixes to be wirelessly received by the mobile device and installed on the mobile device.

13. The mobile device of claim 1, wherein the executable instructions, when executed by the at least one processor, further enable a user setting of the mobile phone to be remotely changed over a wireless network.

14. The mobile device of claim 13, wherein the user setting is a screen saver for the mobile device.

15. The mobile device of claim 13, wherein the user setting is a ring tone for the mobile device.

16. The mobile device of claim 13, wherein the user setting is a backlighting for the mobile device.

17. The mobile device of claim 1, wherein the executable instructions, when executed by the at least one processor, further enable the user of the mobile device to choose, using the user interface, the service plan offered by the first mobile network service provider and to choose, using the user interface, the service plan offered by the second mobile service provider.

18. A method performed by a mobile device, the method comprising:
  causing the mobile device to communicate wirelessly with one or more remote servers to receive mobile network service provider settings data for a plurality of different mobile network service providers and to store the received mobile network service provider settings data in a memory;

causing the mobile device to display on a display, based on the received mobile network service provider settings data, a user interface for enabling a user of the mobile device to select a mobile network service provider from among the plurality of mobile network service providers that are available to provide a wireless service for the mobile device;

in response to a selection, by the user of the mobile device from the user interface, of a first one of the plurality of mobile network service providers, causing the mobile device to be configured for use with the first one of the plurality of mobile network service providers and enable access by the mobile device of a wireless communication service provided by the first one of the plurality of mobile network service providers for a service plan offered by the first one of the plurality of mobile network service providers; and in response to a selection, by the user of the mobile device from the user interface, of a second one of the plurality of mobile network service providers, causing the mobile device to be configured for use with the second one of the plurality of mobile network service providers and enable access by the mobile device of a wireless communication service provided by the second one of the plurality of mobile network service providers for a service plan offered by the second one of the plurality of mobile network service providers.

19. The method of claim 18, wherein at least one of the plurality of mobile network service providers is a mobile network carrier.

20. The method of claim 18, wherein the mobile device includes a setting that specifies one or more conditions under which the wireless service provided by the first one of the plurality of mobile network service providers and the wireless service provided by the second one of the plurality of mobile network service providers are to be provided and wherein the method further comprising controlling wireless communications by the mobile device using the wireless service provided by the first one of the plurality of mobile network service providers and the wireless service provided by the second one of the plurality of mobile network service providers in accordance with the setting.

21. The method of claim 20, wherein the one or more conditions include an order in which the wireless service provided by the first one of the plurality of mobile network service providers and the wireless service provided by the second one of the plurality of mobile network service providers are to be provided.

22. The method of claim 18, wherein the mobile device includes a first setting that specifies when the wireless service provided by the first one of the plurality of mobile network service providers is allowed and wherein the method further comprises controlling wireless communications using the wireless service provided by the first one of the plurality of mobile network service providers according to the first setting.

23. The method of claim 22, wherein the mobile device further includes a second setting that specifies when the wireless service provided by the second one of the plurality of mobile network service providers is allowed and wherein the method further comprises controlling wireless communications using the wireless service provided by the second one of the plurality of mobile network service providers according to the second setting.

24. The method of claim 18, further comprising enabling the user of the mobile device to choose the service plan offered by the first one of the plurality of mobile network service providers and to choose the service plan offered by the second one of the plurality of mobile service providers.

25. The method of claim 18, further comprising wirelessly receiving by the mobile device software patches and fixes and installing the received software patches and fixes on the mobile device.

26. A mobile device comprising:
a display;
a memory;
an antenna;
a transceiver connected to the antenna for communicating voice and data over a wireless communication network;
at least one processor; and
executable instructions stored in the memory, the executable instructions, when executed by the at least one processor,
(i) cause the mobile device to communicate wirelessly over the wireless communication network with one or more remote servers to wirelessly receive mobile network service provider settings data over the wireless communication network for a first mobile network service provider available to provide a wireless service for the mobile device and to store the received mobile network service provider settings data;
(ii) cause the mobile device to communicate wirelessly over the wireless communication network with one or more remote servers to wirelessly receive mobile network service provider settings data over the wireless communication network for a second mobile network service provider available to provide a wireless service for the mobile device and to store the received mobile network service provider settings data;
(iii) cause the mobile device to display on the display, based on the received mobile network service provider settings data, a user interface for enabling a user of the mobile device to select a mobile network service provider from among the first and the second mobile network service providers;
(iv) in response to a selection, by the user of the mobile device from the user interface, of the first mobile network service provider, (a) cause the mobile device to communicate wirelessly with the first one of the plurality of mobile network service providers and enable access by the mobile device of a wireless communication service provided by the first mobile network service provider for a service plan offered by the first mobile network service provider and (b) wirelessly communicate voice and data under the service plan offered by the first mobile network service provider;
(v) in response to a selection, by the user of the mobile device from the user interface, of the second mobile network service provider, (a) cause the mobile device to communicate wirelessly with the second mobile network service provider to enable access by the mobile device of a wireless communication service provided by the second mobile network service provider for a service plan offered by the second one of the plurality of mobile network service provider and (b) wirelessly communication voice and data under the service plan offered by the second mobile network service provider.

27. The mobile device of claim 26, wherein the mobile device includes a setting, determined by the user of the mobile device using the user interface, that specifies one or more conditions under which the wireless service provided by the first mobile network service provider and the wireless service provided by the second mobile network service provider are to be provided.

28. The mobile device of claim 27, wherein the one or more conditions include an order in which the wireless service provided by the first mobile network service provider and the wireless service provided by the second mobile network service provider are to be provided.

29. The mobile device of claim 26, wherein the mobile device includes a setting, determined by the user of the mobile device using the user interface, that specifies when the wireless service provided by the first mobile network service provider is allowed.

30. The mobile device of claim 29, wherein the mobile device further includes a setting, determined by the user of the mobile device using the user interface, that specifies when the wireless service provided by the second mobile network service provider is allowed.

\* \* \* \* \*